(12) United States Patent
Johnston

(10) Patent No.: US 8,793,338 B2
(45) Date of Patent: Jul. 29, 2014

(54) PROVIDING CONTENT DELIVERY DURING A CALL HOLD CONDITION

(75) Inventor: Alan Bernard Johnston, St. Louis, MO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 11/849,717

(22) Filed: Sep. 4, 2007

(65) Prior Publication Data

US 2007/0299939 A1  Dec. 27, 2007

Related U.S. Application Data

(63) Continuation of application No. 10/016,110, filed on Dec. 17, 2001, now Pat. No. 7,266,591.

(51) Int. Cl.
*G06F 15/16* (2006.01)
*G06F 15/173* (2006.01)

(52) U.S. Cl.
USPC ........... 709/219; 709/229; 709/231; 709/237; 709/249

(58) Field of Classification Search
USPC ......... 709/203, 218, 219, 229, 231, 237, 249; 705/14; 707/10, 104.1; 370/352; 379/70, 76, 77, 81–84, 88.17, 88.23, 379/93.12, 101.01, 162–164
See application file for complete search history.

(56) References Cited

U.S. PATENT DOCUMENTS

| | | |
|---|---|---|
| 5,515,421 A | 5/1996 | Sikand et al. |
| 5,592,473 A | 1/1997 | Matern et al. |
| 5,754,627 A | 5/1998 | Butler et al. |
| 5,828,731 A | 10/1998 | Szlam et al. |
| 5,991,374 A | 11/1999 | Hazenfield |
| 6,031,836 A | 2/2000 | Haserodt |
| 6,118,864 A | 9/2000 | Chang et al. |
| 6,199,096 B1 | 3/2001 | Mirashrafi et al. |
| 6,343,314 B1 | 1/2002 | Ludwig et al. |
| 6,421,707 B1 | 7/2002 | Miller et al. |
| 6,456,601 B1 | 9/2002 | Kozdon et al. |
| 6,526,041 B1 | 2/2003 | Shaffer et al. |
| 6,567,412 B1 | 5/2003 | Flake |
| 6,591,115 B1 | 7/2003 | Chow et al. |
| 6,636,733 B1 | 10/2003 | Helferich |
| 6,683,938 B1 | 1/2004 | Henderson |
| 6,738,390 B1 * | 5/2004 | Xu et al. ................. 370/467 |
| 6,754,693 B1 | 6/2004 | Roberts et al. |
| 6,782,252 B1 | 8/2004 | Kang et al. |
| 6,782,419 B2 | 8/2004 | Tobita et al. |
| 6,820,260 B1 | 11/2004 | Flockhart et al. |
| 6,836,478 B1 * | 12/2004 | Huang et al. ............. 370/352 |

(Continued)

OTHER PUBLICATIONS

Handley, M. et al. "SIP: Session Initiation Protocol," RFC 2543, Mar. 1999, pp. 1-153.*

(Continued)

*Primary Examiner* — Melvin H Pollack

(57) ABSTRACT

An approach for providing content transmission upon placement of a call on hold is disclosed. A data communications system includes a proxy server that is configured to receive a message from a first client indicating the hold condition of a Voice Over Internet Protocol (VOIP) call with a second client. The system also includes a content server (e.g., music server) that is configured to transmit the content stored therein to the second client in response to a request message from the server.

21 Claims, 6 Drawing Sheets

(56) References Cited

U.S. PATENT DOCUMENTS

| | | | |
|---|---|---|---|
| 6,853,713 B1 | 2/2005 | Fobert et al. | |
| 6,856,616 B1 | 2/2005 | Schuster et al. | |
| 6,856,676 B1 * | 2/2005 | Pirot et al. | 379/201.01 |
| 6,885,658 B1 * | 4/2005 | Ress et al. | 370/352 |
| 6,907,455 B1 | 6/2005 | Wolfe et al. | |
| 6,909,778 B2 * | 6/2005 | Wengrovitz | 379/201.01 |
| 6,914,897 B1 * | 7/2005 | Schuster et al. | 370/352 |
| 6,934,279 B1 * | 8/2005 | Sollee et al. | 370/352 |
| 6,937,563 B2 * | 8/2005 | Preston et al. | 370/230 |
| 6,937,597 B1 * | 8/2005 | Rosenberg et al. | 370/356 |
| 6,937,699 B1 * | 8/2005 | Schuster et al. | 379/67.1 |
| 6,988,126 B2 * | 1/2006 | Wilcock et al. | 709/204 |
| 7,000,019 B2 * | 2/2006 | Low et al. | 709/227 |
| 7,016,675 B1 * | 3/2006 | Schuster et al. | 455/433 |
| 7,035,252 B2 * | 4/2006 | Cave et al. | 370/356 |
| 7,085,260 B2 * | 8/2006 | Karaul et al. | 370/352 |
| 7,120,141 B2 * | 10/2006 | Kikinis | 370/352 |
| 7,123,700 B1 * | 10/2006 | Weaver et al. | 379/88.19 |
| 7,123,707 B1 * | 10/2006 | Hiri et al. | 379/215.01 |
| 7,126,939 B2 * | 10/2006 | Barany et al. | 370/352 |
| 7,133,923 B2 * | 11/2006 | MeLampy et al. | 709/231 |
| 7,173,925 B1 * | 2/2007 | Dantu et al. | 370/352 |
| 7,185,094 B2 * | 2/2007 | Marquette et al. | 709/225 |
| 7,227,927 B1 * | 6/2007 | Benedyk et al. | 379/9.05 |
| 7,233,980 B1 * | 6/2007 | Holden et al. | 709/219 |
| 7,296,091 B1 * | 11/2007 | Dutta et al. | 709/245 |
| 7,302,251 B2 * | 11/2007 | Barany et al. | 455/405 |
| 7,313,593 B1 * | 12/2007 | Pulito et al. | 709/204 |
| 7,369,535 B2 * | 5/2008 | O'Brien et al. | 370/352 |
| 7,386,000 B2 * | 6/2008 | Lopponen et al. | 370/433 |
| 7,394,807 B2 * | 7/2008 | Hamiti et al. | 370/389 |
| 7,418,509 B2 * | 8/2008 | Koskelainen et al. | 709/229 |
| 7,460,533 B1 * | 12/2008 | Tripathi et al. | 370/390 |
| 7,512,115 B2 * | 3/2009 | Nelson et al. | 370/352 |
| 7,516,177 B2 * | 4/2009 | Knapp et al. | 709/203 |
| 8,027,874 B2 * | 9/2011 | Angles et al. | 705/14.4 |
| 8,117,286 B2 * | 2/2012 | Kirsch et al. | 709/219 |
| 8,135,796 B1 * | 3/2012 | Slaughter et al. | 709/217 |
| 8,194,646 B2 * | 6/2012 | Elliott et al. | 370/352 |
| 8,392,532 B2 * | 3/2013 | Wood et al. | 709/219 |
| 8,417,770 B2 * | 4/2013 | Vange et al. | 709/203 |
| 8,478,778 B2 * | 7/2013 | Baffier et al. | 707/769 |
| 8,483,371 B2 * | 7/2013 | Crandell et al. | 379/142.06 |
| 2001/0028654 A1 | 10/2001 | Anjum et al. | |
| 2003/0208601 A1 * | 11/2003 | Campbell et al. | 709/227 |
| 2004/0093376 A1 * | 5/2004 | De Boor et al. | 709/203 |

OTHER PUBLICATIONS

Petrack, S. and Conroy, L. "The PINT Service Protocol: Extensions to SIP and SDP for IP Access to Telephone Call Services," RFC 2848, Jun. 2000, pp. 1-73.*

Schulzrinne, H. and Rosenberg, J. "Signaling for Internet Telephony," Proceedings of the Sixth International Conference on Network Protocols, Oct. 13-16, 1998, pp. 298-307.*

Schulzrinne, Henning G. and Rosenberg, Jonathan D. "The Session Initiation Protocol: Providing Advanced Telephony Services Across the Internet," Bell Labs Technical Journal on Packet Networking, vol. 3, Issue 4, Dec. 1998, pp. 144-160.*

Deering, Stephen E. "SIP: Simple Internet Protocol," IEEE Network, vol. 7, Issue 3, May 1993, pp. 16-28.*

* cited by examiner

PROVIDING CONTENT DELIVERY DURING A CALL HOLD CONDITION

CROSS REFERENCE TO RELATED CASES

The present application is a continuation of U.S. patent application Ser. No. 10/016,110 filed on Dec. 17, 2001, now U.S. Pat. No. 7,266,591, issued Sep. 4, 2007, the contents of which are hereby incorporated by reference.

FIELD OF THE INVENTION

The present invention relates to a communications system, and is more particularly related to call processing over a data network.

BACKGROUND OF THE INVENTION

The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as Voice-over-IP (VOIP), is the conversion of voice information into data packets that are transmitted over an IP network. Users also have turned to IP telephony as a matter of convenience in that both voice and data services are accessible through a single piece of equipment, namely a personal computer. The continual integration of voice and data services further fuels this demand for IP telephony applications that support a breath of new services. In addition to the development of new services and features, it is recognized that the traditional telephony services need to be retained.

The Session Initiation Protocol (SIP) has emerged to address the signaling of calls over an IP network. As an end-to-end protocol, SIP advantageously permits the end nodes with the capability to control call processing. By contrast, traditional telephony services are totally controlled by the intermediate network components; that is, the switches have full control over call establishment, switching, and call termination. In the SIP architecture, it is sometimes desirable for an intermediate network element to control the call processing. For example, codec (coder/decoder) incompatibility may require network intervention to ensure that the exchange of packets are meaningful.

Because of the architectural differences between VOIP systems and conventional telephony systems, effecting traditional telephony services, such as music-on-hold, poses a challenge in terms of signaling and efficient use of network resources. The music-on-hold feature provides the party that is placed on hold to listen to a predetermined catalog of music so that the party is aware that the party is on hold.

In a business setting (e.g., call center applications) a caller's willingness to be placed on hold can translate into an increased customer base. The capability for the party to listen to music may have a calming effect so that the party does not grow too impatient during the suspension of the call. In addition to music, a retailer, for example, may place advertisements (or in place of) to alert the party on hold of the products and services that the retailer offers. Therefore, a music-on-hold feature has tremendous commercial value. However, this value is greatly diminished if the cost of implementation is disproportionate.

Therefore, there is a need for an approach for efficiently performing a music-on-hold type feature in a data communications system. There is also a need to preserve a standard architecture to promote deployment of network services, while minimizing system complexity and resources. There is also a need to implement telephony services cost effectively.

SUMMARY OF THE INVENTION

These and other needs are addressed by the present invention in which a data communications system provides a network-based music-on-hold feature. Using an application layer protocol, such as the Session Initiation Protocol (SIP), a server, acting as a SIP proxy server, communicates with a content server (e.g., a music server) to establish a media session between a client that is placed on hold and the content server. Upon establishment of the media session, the proxy server instructs the client that placed the call on hold to stop sending media, thereby preserving bandwidth. The client that placed the call on hold can specify the content that is to be transmitted to the client on hold. The above approach advantageously provides efficient use of network resources and improves scalability.

In one aspect of the present invention, a data communication system for providing content transmission upon placement of a call on hold is disclosed. The system includes a server that is configured to receive a message from a first client indicating the hold condition of the call with a second client. The system also includes another server that is configured to transmit the content stored therein to the second client in response to a request message from the server.

In another aspect of the present invention, a method for providing content transmission over a data network upon placement of a call on hold is disclosed. The method includes receiving a message from a first client indicating the hold condition of the call with a second client. Additionally, the method includes transmitting a request message to a content server to instruct the content server to transmit content stored therein to the second client.

In another aspect of the present invention, a network device for providing content transmission over a data network upon placement of a call on hold is disclosed. The device includes a communications interface that is configured to receive a message from a first client indicating the hold condition of the call with a second client. The device also includes a processor that is coupled to the communications interface and is configured to generate a request message to be transmitted to a content server to instruct the content server to transmit content stored therein to the second client.

In another aspect of the present invention, a network device for providing content transmission over a data network upon placement of a call on hold is disclosed. The device includes means for receiving a message from a first client indicating the hold condition of the call with a second client, and means for generating a request message to be transmitted to a content server to instruct the content server to transmit content stored therein to the second client.

In yet another aspect of the present invention, a computer-readable medium carrying one or more sequences of one or more instructions for providing content transmission over a data network upon placement of a call on hold is disclosed. The one or more sequences of one or more instructions include instructions which, when executed by one or more processors, cause the one or more processors to perform the step of receiving a message from a first client indicating the hold condition of the call with a second client. Another step includes transmitting a request message to a content server to instruct the content server to transmit content stored therein to the second client.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed with respect to the Session Initiation Protocol (SIP), it should be appreciated that one of ordinary skill in the art would recognize that the present invention has applicability to other equivalent communication protocols.

Figure 1:
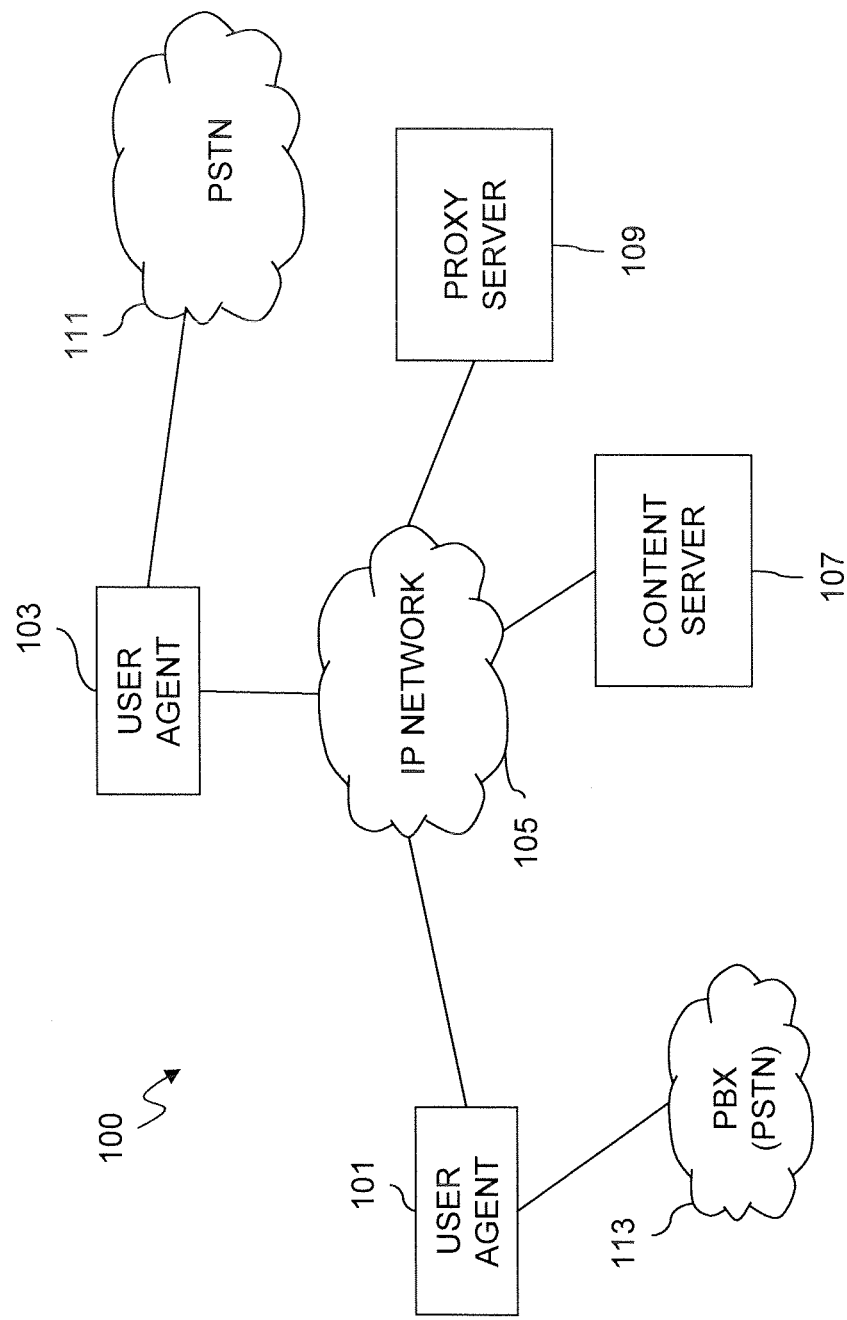
FIG. 1 is a diagram of a data communications system including a content server and a proxy server to provide a music-on-hold type feature, according to an embodiment of the present invention.

FIG. 1 is a diagram of a data communications system including a content server and a proxy server to provide a music-on-hold type feature, according to an embodiment of the present invention. In particular, the communication system 100 supports IP telephony services among multiple user agents 101, 103, which are more fully described below. The user agents 101, 103 exchange messages over the IP network 105 during a voice call. A content server 107 stores content that is transmitted to one of the user agents 101, 103 during a hold condition of a call between the user agents 101, 103. In an exemplary embodiment, the content server 107 stores music files, and hence, may be referred to as a music server. Alternatively, the content server 107 may store any type of audio file, such as advertisement messages.

The system 100 utilizes a proxy server 109 for establishment of calls among the user agents 101, 103 and the content server 107, as described below with respect to FIGS. 3-5. As shown, the user agent 103 is connected to the Public Switched Telephone Network (PSTN) 111. In this example, the user agent 101 has connectivity to a Private Branch Exchange (PBX), which in turn, passes calls through to the PSTN 111; alternatively, the user agent 101 may couple to the PSTN 111 directly.

Because the PSTN 111 is connected to the IP network 105, communication among voice stations (not shown) that are serviced through the PSTN 111, and personal computers that are attached to the IP network 105 can be established (e.g., Voice over IP (VOIP)). Attention is now drawn to transmission of voice calls over the IP network 105.

Four possible scenarios exist with the placement of a VOIP call: (1) phone-to-phone, (2) phone-to-PC, (3) PC-to-phone, and (4) PC-to-PC. In the first scenario of phone-to-phone call establishment, a voice station is switched through PSTN 111 by a switch to a VOIP gateway (not shown), which forwards the call through the IP network 105. The packetized voice call is then routed through the IP network 105, exiting the IP network 105 at an appropriate point to enter the PSTN 111 and terminates at a voice station. Under the second scenario, a voice station places a call to PC through a switch to the PSTN 111. This voice call is then switched by the PSTN 111 to a VOIP gateway (not shown), which forwards the voice call to a PC via the IP network 105. The third scenario involves a PC that places a call to a voice station. Using a voice encoder, the PC introduces a stream of voice packets into the IP network 105 that are destined for a VOIP gateway (not shown). A VOIP gateway (not shown) converts the packetized voice information into a POTS (Plain Old Telephone Service) electrical signal, which is circuit switched to the voice station. Lastly, in the fourth scenario, a PC establishes a voice call with a PC; in this case, packetized voice data is transmitted from the PC via the IP network 105 to another PC, where the packetized voice data is decoded.

The system 100 may employ SIP to exchange messages. A detailed discussion of SIP and its call control services are described in IETF RFC 2543 and IETF Internet draft "SIP Call Control Services", Jun. 17, 1999; both of these documents are incorporated herein by reference in their entireties. SIP messages are in form of either requests or responses. The user agents 101, 103 may behave as either a user agent client (UAC) or a user agent server (UAS), depending on the services that the system 100 is executing. In general, a user agent client issues requests, while a user agent server provides responses to these requests.

SIP defines numerous types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request.

Another method is the BYE request, which indicates to the UAS that the call should be released. In other words, BYE terminates a connection between two users or parties in a conference. The next method is the OPTIONS method; this method solicits information about capabilities and does not assist with establishment of a call. Lastly, the REGISTER provides information about a user's location to a SIP server.

According to an embodiment of the present invention, the proxy server 109 provides a network-based music-on-hold feature, whereby the proxy server 109 establishes a music media session with the content server 107 and the user agent 101, 103 that is on hold. Because the feature is provided by the network, the functionalities of the user agents 101, 103 can be simplified.

Since SIP can be used for signaling, a media session transported using schemes such as RTP (Reliable Transport Protocol)/UDP (User Datagram Protocol), RTP/TCP (Transmission Control Protocol), RTP/SCTP (Stream Control Transmission Protocol), and AAL (ATM Adaptation Layer)/ATM (Asynchronous Transfer Mode) among many others; this service allows calling between schemes in an efficient way. To appreciate the present invention, a brief description of the SIP protocol architecture is now described with respect to FIG. 2.

Figure 2:
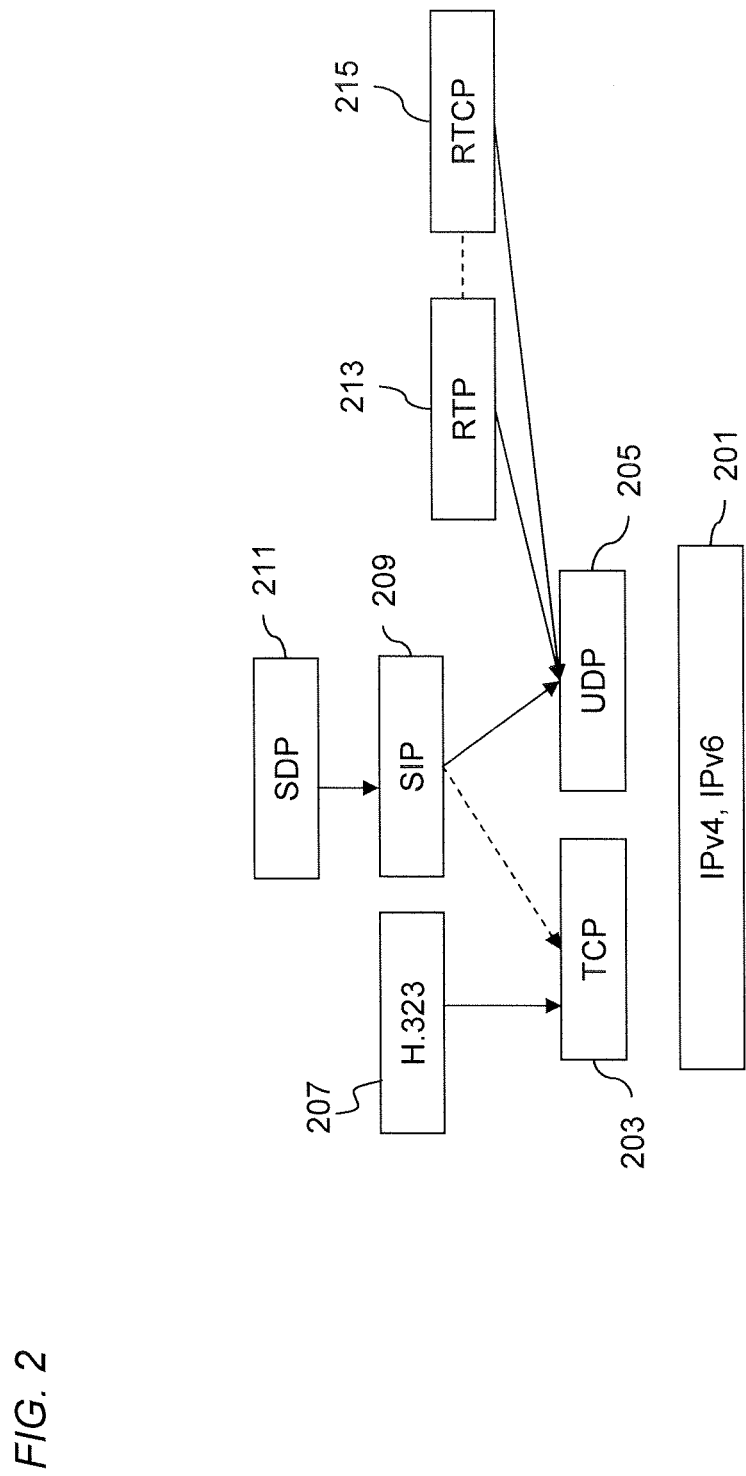
FIG. 2 is a diagram of an exemplary protocol architecture employed in the system of FIG. 1.

FIG. 2 is a diagram of an exemplary protocol architecture employed in the system of FIG. 1. The layered nature of the architecture provides protocol separation and independence, whereby one protocol can be exchanged or modified without affecting the other higher layer or lower layer protocols. It is advantageous that the development of these protocols can occur concurrently and independently.

The foundation of the architecture rests with the IP layer 201. The IP layer 201 provides an unreliable, connectionless data delivery service at the network level. The service is "unreliable" in the sense that the delivery is on a "best effort" basis; that is, no guarantees of packet delivery are made. IP is the de facto Internet working protocol standard. Current standards provide two versions of IP: Version 4 and Version 6. One of the key differences between the versions concerns addressing; under Version 4, the address fields are 32 bits in length, whereas in Version 6, the address field has been extended to 128 bits.

Above the IP layer 201 are the TCP (Transmission Control Protocol) 203 and the UDP (User Datagram Protocol) 205. The TCP layer 203 provides a connection-oriented protocol that ensures reliable delivery of the IP packets, in part, by performing sequencing functions. This sequencing function reorders any IP packets that arrive out of sequence. In contrast, the User Datagram Protocol (UDP) 205 provides a connectionless service that utilizes the IP protocol 201 to send a data unit, known as a datagram. Unlike TCP 203, UDP 205 does not provide sequencing of packets, relying on the higher layer protocols to sort the information. UDP 205 is preferable over TCP 203 when the data units are small, which saves processing time because of the minimal reassembly time. One of ordinary skill in the art would recognize that embodiments of the present invention can be practiced using either TCP 203 or UDP 205, as well as other equivalent protocols.

The next layer in the IP telephony architecture of FIG. 2 supplies the necessary IP telephony signaling and includes the H.323 protocol 207 and the Session Initiation Protocol (SIP) 209. The H.323 protocol 207, which is promulgated by the International Telecommunication Union (ITU), specifies a suite of protocols for multimedia communication. SIP 209 is a competing standard that has been developed by the Internet Engineering Task Force (IETF). SIP 209 is a signaling protocol that is based on a client-server model. It should be noted that both the H.323 protocol 207 and SIP 209 are not limited to IP telephony applications, but have applicability to multimedia services in general. In an embodiment of the present invention, SIP 209 is used to create and terminate voice calls over an IP network 105. However, it is understood that one of ordinary skill in the art would realize that the International Telecommunications Union (ITU) H.323 protocol suite 207 and similar protocols can be utilized in lieu of SIP 209. Above SIP 209 is the Session Description Protocol (SDP) 211, which provides information about media streams in the multimedia sessions, as to permit the recipients of the session description to participate in the session.

As seen in FIG. 2, SIP 209 can utilize either TCP 203 or UDP 205. Similar to other IETF protocols (e.g., the simple mail transfer protocol (SMTP) and Hypertext Transfer Protocol (HTTP)), SIP 209 is a textual protocol. As indicated earlier, SIP 209 is a client-server protocol, and as such, clients generate requests that are responded to by the servers.

Figure 3:
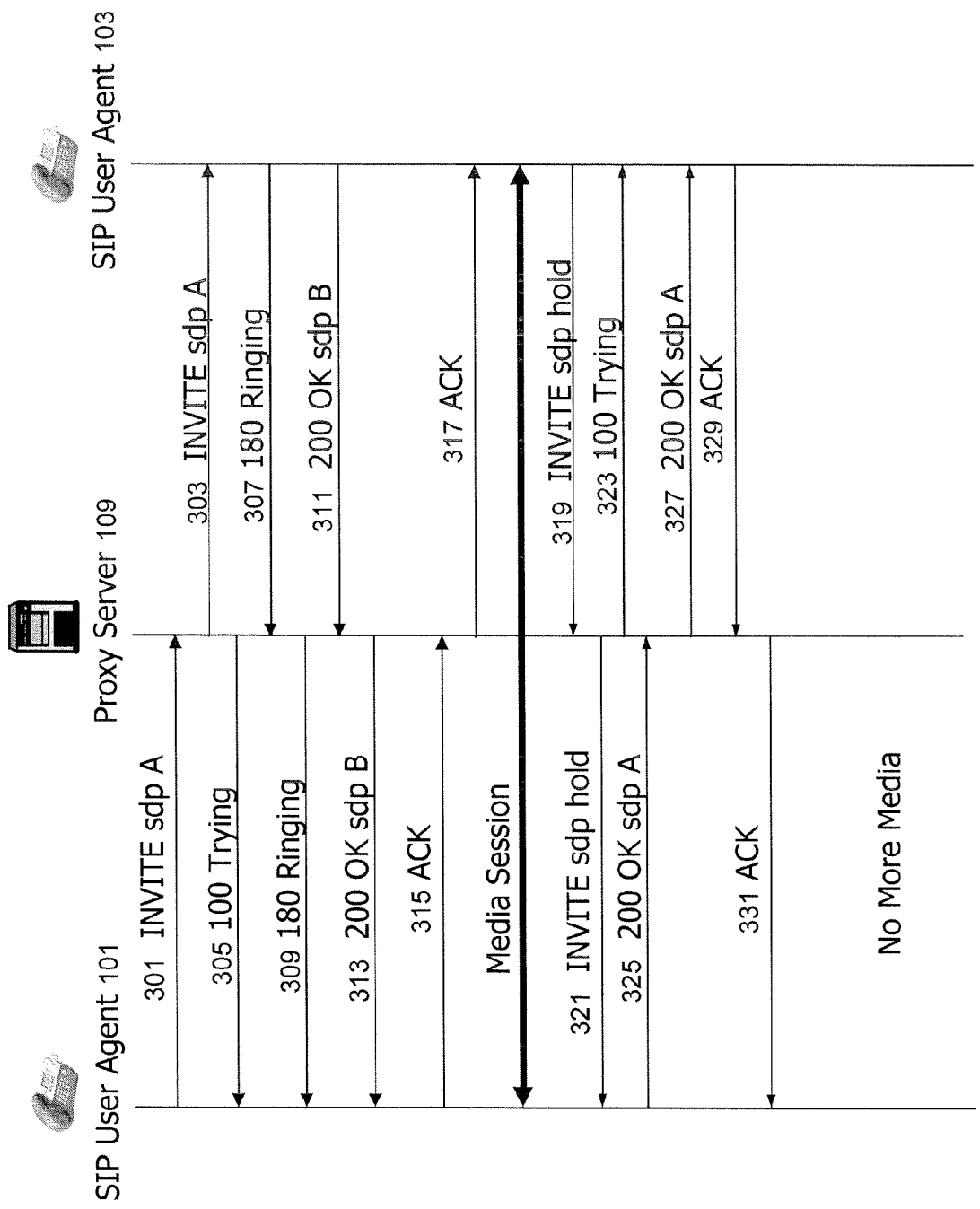
FIG. 3 is a diagram of a call flow for providing a call hold feature.

FIG. 3 is a diagram of a call flow for providing a call hold feature. As shown, a call is established between the user agent 101 and the user agent 103. Specifically, in step 301, the user agent 101 sends an INVITE message with an associated SDP body (e.g., sdp A) to the proxy server 109; "A" refers to the user agent 101. In turn, the proxy server 109, as in step 303, forwards the INVITE message to the user agent 103. The proxy server also sends a 100 TRYING message, per step 305, to the user agent 101 in response to the received INVITE message. Next, in step 307, the user agent 103 sends a 180 RINGING message to the proxy server 109, which the forwards the message to the user agent 101 (per steps 307 and 309). The user agent 103, as in step 311, transmits a 200 OK with a message body (sdp B) to the proxy server 109; "B" refers to the user agent 103. In step 313, the proxy server 109 forwards the 200 OK message to the user agent 101, which responds with an acknowledgement (ACK) message, per step 315. The ACK is relayed by the proxy server 109 to the user agent 103 (step 317). At this point, a media session (i.e., call) is established between the user agent 101 and the user agent 103.

To invoke a call hold condition, a user associated with the user agent 103 presses a "hold" button on a set or selects "hold" from a pull down menu or clicks on a button on a screen. This causes the user agent 103 to send a re-INVITE message to the other user agent 101 with the SDP indicating a hold state. As a result, the other user agent 101 stops sending media until the call is taken off hold by a re-INVITE with connection IP Address of the User Agent.

In particular, in step 319, the user agent 103 (which is placing the user agent 101 on hold) sends an INVITE sdp hold message to the proxy server 109, which in turn transmits the message to the user agent 101 (per step 321). In step 323, the proxy server 109 sends a 100 TRYING message to the user agent 103. In step 325, the user agent 101 sends a 200 OK sdp A message to the user agent 103 via the proxy server 109, per steps 325 and 327. In response, the user agent 103 sends an ACK message to the proxy server 109 (step 329); the ACK message is then forwarded to the user agent 101, per step 331. Thus, the user agent 101 does not transmit any additional media.

The above hold feature is modified to introduce a content server, whereby the user agent 103 controls the call processing, as seen below in FIG. 4.

Figure 4:
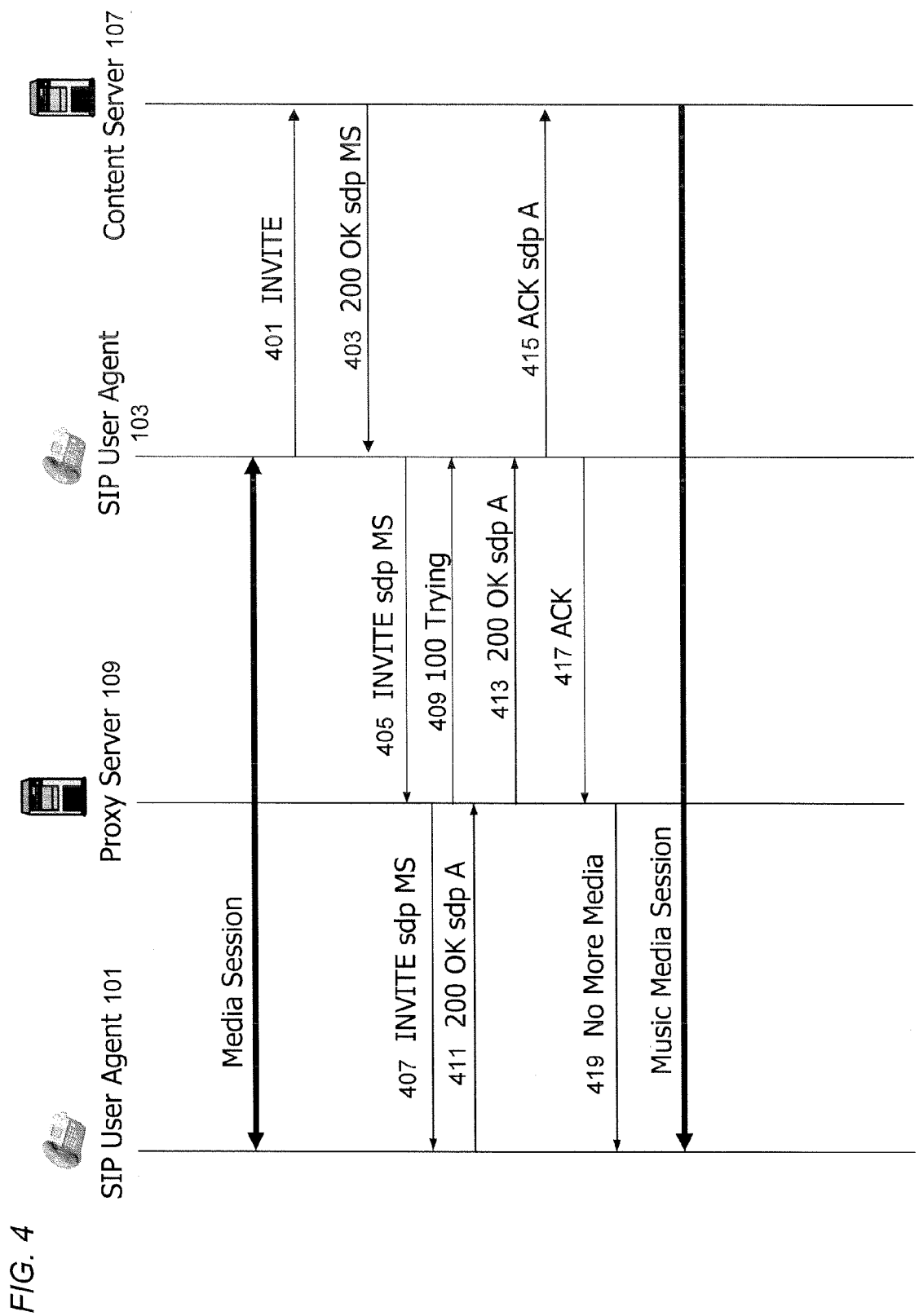
FIG. 4 is a diagram of a call flow for providing a music-on-hold feature via call control at a user agent.

FIG. 4 is a diagram of a call flow for providing a music-on-hold feature via call control at a user agent. In this example, a media session is established between the user agent 101 and the user agent 103 in similar fashion as in the steps 301-317 of the process of FIG. 3. In step 401, the user agent 103 sends an INVITE message to the content (e.g., music) server 107. The server 107, in response, sends a 200 OK message with sdp MS (Music Server) to the user agent 103, per step 403. In step 405, the user agent 103 transmits an INVITE sdp MS message to the proxy server 109, which forwards the message to the user agent 101, per step 407. In step 409, the proxy server 109 sends a 100 TRYING message to the user agent 103. In step 411, the user agent 101 sends a 200 OK sdp A message to the proxy server 109; the proxy server 109 relays this message to the user agent 103, as in step 413. In step 415, the user agent 103 forwards an ACK sdp A message to the content server 107, and sends an ACK to the proxy server 109 (step 417). The proxy server 109, in step 419, instructs the user agent 101 not to send any further media. Accordingly, the server 107 can begin transmitting content (e.g., music) to the user agent 101.

In this terminal based approach, the user agent 103 acts as a Back-to-Back User Agent (B2BUA) and uses SIP 3 pcc (SIP Third Party Call Control) to INVITE a content (e.g., music) server 107, which is sent the SDP information of the other user agent 101. The user agent 101 receives a re-INVITE with hold SDP, and then receives RTP music sent from the server 107. Unfortunately, this approach requires processing on the part of the terminal (i.e., user agents 101, 103). By contrast, the present invention provides a network-based approach (as shown in FIG. 5), whereby the complexity of the music-on-hold service resides within the network, not within the user terminal.

Figure 5:
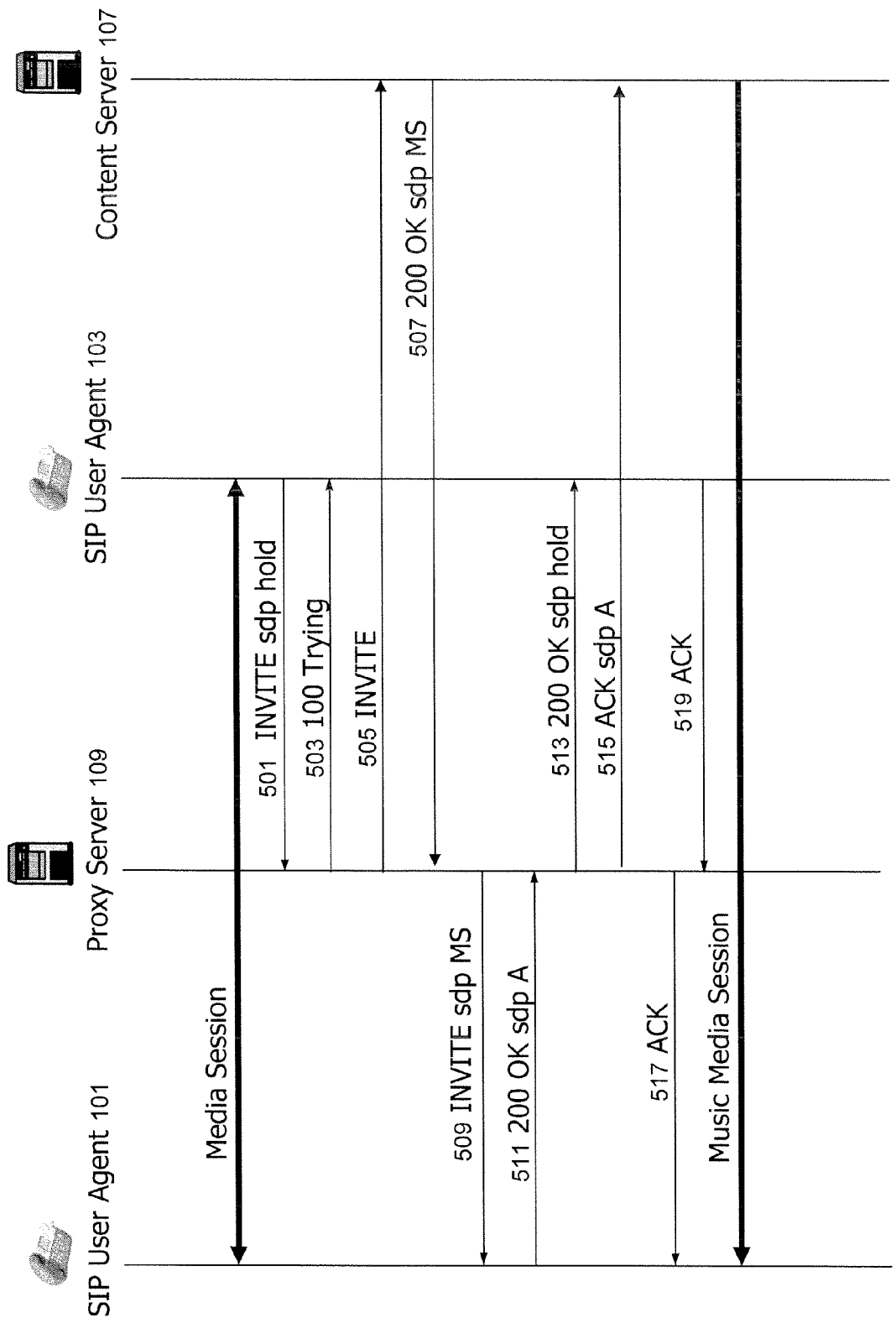
FIG. 5 is a diagram of a call flow for providing a music-on-hold feature via call control at a proxy server, according to an embodiment of the present invention.

FIG. 5 is a diagram of a call flow for providing a music-on-hold feature via call control at a proxy server, according to an embodiment of the present invention. A media session is established between the user agent 101 and the user agent 103 in similar fashion as in the steps 301-317 of the process of FIG. 3. Unlike the process of FIG. 4, this process does not impose any additional capabilities on the terminal (i.e., user agents 101, 103), requiring only support for the base SIP specification, IETF RFC 2543. As with the process of FIG. 4, when the user presses the "hold" button, the terminal sends a re-INVITE. However, in this process, the proxy server 109 intercepts the re-INVITE and performs call control (e.g., the SIP 3 pcc) with respect to the content server 107, effectively on behalf of the user agent 103. When the user takes the remote party off of hold, the proxy server 109 processes the re-INVITE with a normal SDP and disconnects the content server 107 from the call.

Specifically, in step 501, the user agent 103 sends an INVITE sdp hold message to the proxy server 109, which responds to the user agent 103 with a 100 TRYING message (step 503). In step 505, the proxy server 109 contacts the content server 107 with an INVITE message. In step 507, the content server 107 (e.g., music server) sends a 200 OK sdp MS (Music Server) message to the proxy server 109. Next, the proxy server 109, as in step 509, sends an INVITE sdp MS message to the user agent 101. In response to the received INVITE sdp MS message, the user agent 101 sends a 200 OK sdp A message, per step 511. In step 513, the proxy server 109 forwards a 200 OK sdp hold message to the user agent 103. The proxy server 109 sends an ACK sdp A message to the content server 107, per step 515. In step 517, the proxy server 109 transmits an ACK message to the user agent 101. The user agent 103 transmits an ACK message to the proxy server 109 in step 519. At this point, the content server 107 can supply content to the user agent 101. In this example, the content that is supplied is music, which may be in the form of music files or streaming audio files.

In an exemplary embodiment, the proxy server 109 may have a number of different music selections, from different types of music to company specific sales and information recordings. The selection of which music to play can be made by the proxy server 109 based on the From address of the re-INVITE and communicated to the content server 107 by a specific Request-URI in the 3 pcc INVITE message. The use of a special header in the re-INVITE or a provisioned table of From headers by the proxy server 109 permits selection of the type of content to be delivered to the user agent 101.

Alternatively, the user agent 103 may select the type of content to play to the user agent 101 using, for example, a special SIP header extension, which could be of the form "Music-On-Hold: classical" or "Music-On-Hold: http://www.music.com/classical-hits.wav" where a URL is used to reference a specific music wave file. This header could be either passed on unchanged by the proxy server 109 in the 3 pcc INVITE, or the header could be translated into a SIP Request-URI.

Under the above network-based approach for providing music-on-hold, the proxy server 109 is used to detect the hold condition and invoke 3 pcc. The modification of the SDP response to the re-INVITE by the proxy server 109 effectuates a reverse hold condition, thereby preventing the user agent 103 from sending media to the other user agent 101—which currently receives media from the content server 107.

As indicated previously, the music-on-hold feature may alternatively be implemented according to the ITU H.323 protocol suite.

Figure 6:
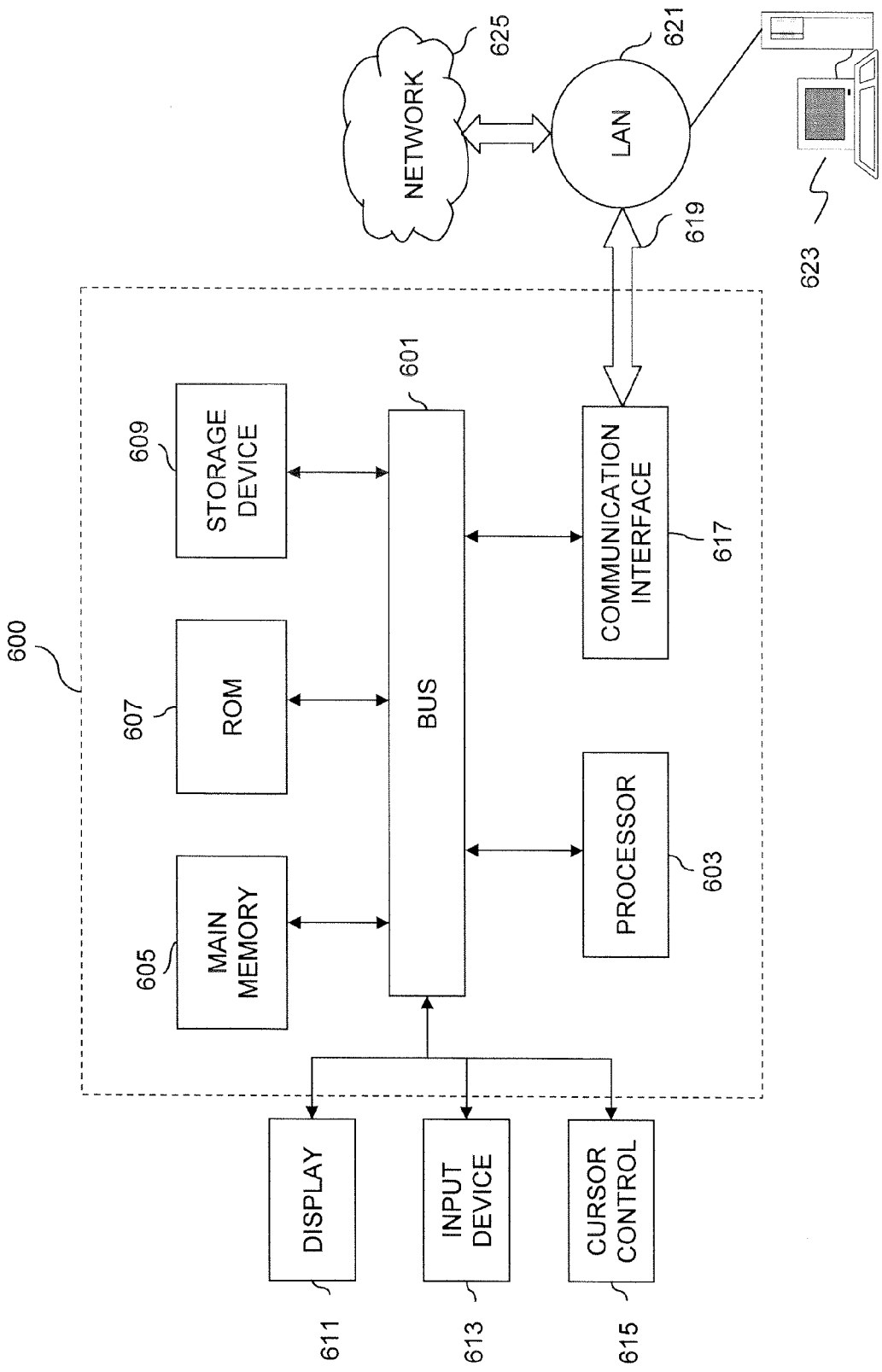
FIG. 6 is a diagram of a computer system that can be used to implement an embodiment of the present invention.

FIG. 6 illustrates a computer system 600 upon which an embodiment according to the present invention can be implemented. The computer system 600 includes a bus 601 or other communication mechanism for communicating information, and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is cursor control 615, such as a mouse, a trackball, or cursor direction keys for communicating direction information and command selections to the processor 603 and for controlling cursor movement on the display 611.

According to one embodiment of the invention, the process of FIG. 5 may be performed by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, or a telephone modem to provide a data communication connection to a corresponding type of telephone line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although only a single communication interface 617 is shown, it is recognized that multiple communication interfaces may be employed to communicate with different networks and devices.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by service provider. The local network 621 and network 625 both use electrical, electromagnetic, or optical signals to convey information and instructions. The signals through the various networks and the signals on network link 619 and through communication interface 617, which communicate digital data with computer system 600, are exemplary forms of carrier waves bearing the information and instructions.

The computer system 600 can send messages and receive data, including program code, through the network(s), network link 619, and communication interface 617. In the Internet example, a server (not shown) might transmit requested code belonging an application program for implementing an embodiment of the present invention through the network 625, local network 621 and communication interface 617. The processor 603 may execute the transmitted code while being received and/or store the code in storage device 69, or other non-volatile storage for later execution. In this manner, computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as storage device 609. Volatile media include dynamic memory, such as main memory 605. Transmission media include coaxial cables, copper wire and fiber optics, including the wires that comprise bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the present invention provides a network-based music-on-hold feature. A proxy server performs call control (e.g., SIP 3 pcc) to establish a media session between a content server and the user agent that is on-hold. The above approach advantageously reduces complexity of the terminals (e.g., SIP phones) and enhances scalability, while maintaining a standardized architecture.

While the present invention has been described in connection with a number of embodiments and implementations, the present invention is not so limited but covers various obvious modifications and equivalent arrangements, which fall within the purview of the appended claims.

What is claimed is:

1. A method comprising:
receiving a request message for content from a proxy server that is configured to transmit the request message during a hold condition of a voice call established between a first user agent and a second user agent over a data network, wherein a type of the content is selected by the proxy server via a packet header extension in the request message; and
communicating with the second user agent, via the proxy server, to establish a media session with the second user agent for transmitting the content, wherein the proxy server is configured to instruct the second user agent to stop transmitting media for the voice call.

2. A method according to claim 1, wherein the first user agent notifies the proxy server of the hold condition, the proxy server being further configured to perform call control on behalf of the first user agent.

3. A method according to claim 1, wherein the establishment of the voice call and the media session is according to Session Initiation Protocol (SIP), and the content includes music.

4. A method according to claim 3, wherein the request message is a first INVITE message, the establishment of the media session includes,
transmitting a 200 OK message in response to first INVITE message to the proxy server, wherein the proxy server is further configured to transmit a second INVITE message to the second user agent.

5. A method according to claim 4, wherein the second user agent responds to the second INVITE message with another 200 OK message to the proxy server forwarding to the first user agent, wherein the proxy server is further configured to generate an ACK message, the method further comprising:
receiving the ACK message; and
retrieving the content; and
transmitting the content over the media session to the second user agent.

6. A method according to claim 3, wherein the content further includes advertisements.

7. A method according to claim 1, wherein the first user agent notifies the proxy server of the hold condition, the proxy server being configured to perform call control on behalf of the first user agent.

8. An apparatus comprising:
a memory configured to store content;
a processor coupled to the memory and configured to receive a request message for the content from a proxy server that is configured to initiate the request message during a hold condition of a voice call established between a first user agent and a second user agent over a data network, wherein a type of the content is specified by the proxy server, via an extension in the request message; and
a communication interface coupled to the processor and configured to communicate with the second user agent, via the proxy server, to establish a media session with the second user agent for transmitting the content, wherein the proxy server is configured to instruct the second user agent to stop transmitting media for the voice call.

9. An apparatus according to claim 8, wherein the first user agent notifies the proxy server of the hold condition, the proxy server being further configured to perform call control on behalf of the first user agent.

10. An apparatus according to claim 8, wherein the establishment of the voice call and the media session is according to Session Initiation Protocol (SIP), and the content includes music.

11. An apparatus according to claim 10, wherein the request message is a first INVITE message, and the communication interface, in support of establishing the media session, is further configured to transmit a 200 OK message in response to first INVITE message to the proxy server, wherein the proxy server is further configured to transmit a second INVITE message to the second user agent.

12. An apparatus according to claim 11, wherein the second user agent responds to the second INVITE message with another 200 OK message to the proxy server forwarding to the first user agent, wherein the proxy server is further configured to generate an ACK message, the processor being further configured to receive the ACK message, to retrieve the content, the communication interface being further configured to transmit the content over the media session to the second user agent.

13. An apparatus according to claim 10, wherein the content further includes advertisements.

14. An apparatus according to claim 8, wherein the first user agent notifies the proxy server of the hold condition, the proxy server being configured to perform call control on behalf of the first user agent.

15. An apparatus according to claim 8, wherein the apparatus is a content server, and the proxy server is maintained by a service provider.

16. An apparatus according to claim 15, wherein the content server is provided by a third party.

17. A method comprising:
detecting, at a proxy server within a service provider network, a hold condition for a packetized voice call between voice stations; and
facilitating, via the proxy server, establishment of a media session with a content device to deliver content to one of the voice stations that is on hold, wherein a type of the content is specified by the proxy server via a packet header extension in a request message.

18. A method according to claim 17, wherein the proxy server is configured to perform call control on behalf of the voice stations.

19. A system comprising:
a proxy server, within a service provider network, configured to detect a hold condition for a packetized voice call between voice stations to facilitate establishment of a media session with a content device to deliver content to one of the voice stations that is on hold, wherein a type of the content is specified by the proxy server via a packet header extension in a request message.

20. A system according to claim 19, wherein the proxy server is configured to perform call control on behalf of the voice stations.

21. A method according to claim 1, wherein a specific content file is referenced via a Uniform Reference Locator (URL).

* * * * *